Dec. 5, 1950     D. J. DONAHOE ET AL     2,532,999
HEATABLE WATER TANK
Filed May 17, 1948     2 Sheets-Sheet 1
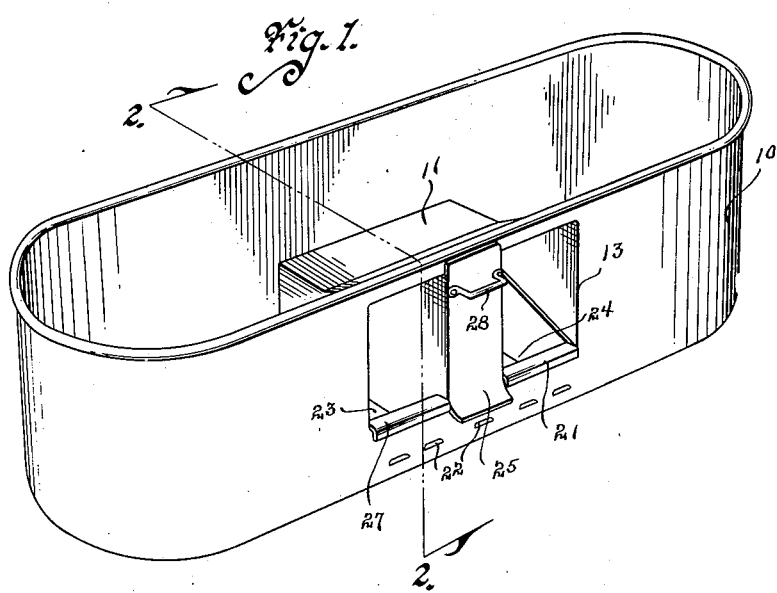
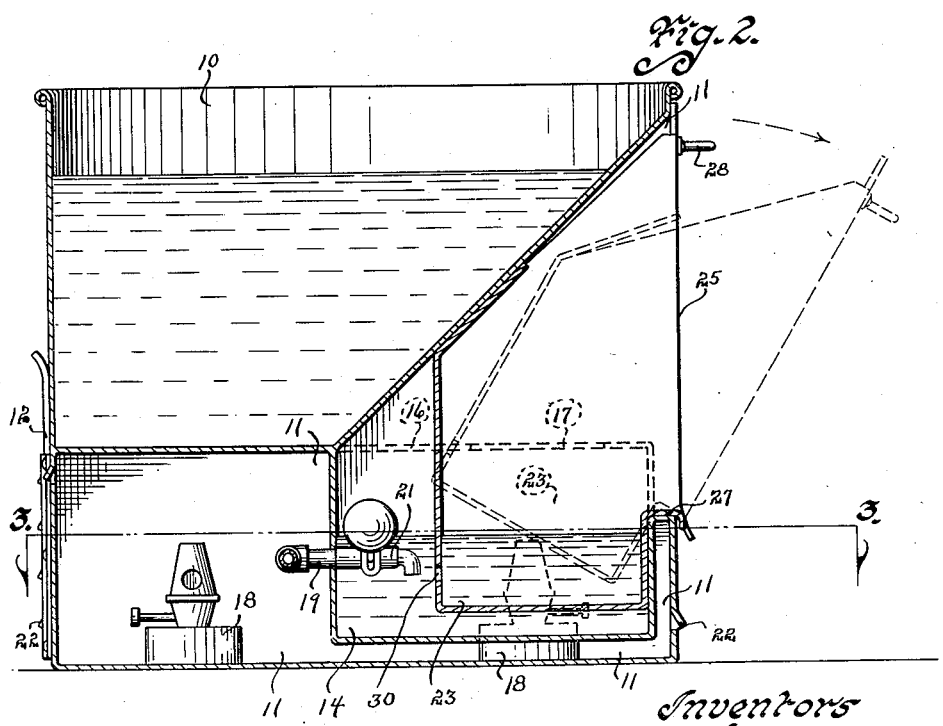
Inventors
Donald J. Donahoe & Paul J. Donahoe
by M. Talbert Dick
Attorney
Witness
Edward P. Seeley Dec. 5, 1950  D. J. DONAHOE ET AL  2,532,999
HEATABLE WATER TANK Filed May 17, 1948  2 Sheets—Sheet 2

Inventors
Donald J. Donahoe
& Paul J. Donahoe
by M. Talbert Dick
Attorney

Witness
Edward P. Seeley

Patented Dec. 5, 1950

2,532,999

UNITED STATES PATENT OFFICE 2,532,999

HEATABLE WATER TANK

Donald J. Donahoe and Paul J. Donahoe,
Fort Dodge, Iowa

Application May 17, 1948, Serial No. 27,576

5 Claims. (Cl. 119—73)

The principal object of our invention is to take a standard stock water tank and reconstruct it so that the water therein will not freeze even in the coldest weather.

A further object of this invention is to provide a water tank that will provide water facilities for both large and small animals, such as cattle and hogs.

A still further object of our invention is to provide a heated water stock tank for both large and small animals that warms all the water in all the water compartments from a single heating chamber.

A still further object of this invention is to provide a large and small animal water tank that permits that portion from which the smaller animals drink to be kept in a clean and sanitary condition.

A still further object of our invention is to provide a heatable stock water tank that is capable of keeping the water from freezing at a very low cost.

A still further object of this invention is to provide a heatable stock water tank in combination for both small and large animals that is economical in manufacture, refined in appearance, and durable in use.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

Fig. 1 is a perspective view of our tank ready for use.

Fig. 2 is a cross-sectional view of the tank taken on line 2—2 of Fig. 1.

There have been many heatable stock tanks before our invention. These tanks have, however, usually been of the fountain type, very complicated, and have not been adapted to a standard elongated type water tank, such as is now in general usage in all farm sections. Furthermore, they are not easily serviced as to the heating means, and most difficult to clean. Also they are usually of a design for large animals only, or for small animals only. We have overcome such objections by providing a heatable water tank that can be used for both large and small animals as a unit, or used for small animals only, or for large animals only. Furthermore, our invention is applicable to standard farm water tanks, and is usable the year around. Another advantage of our device is that the removable small animal drinking portion may be easily and quickly cleaned without its removal from the main tank. We will now describe our tank in detail.

Figure 3:
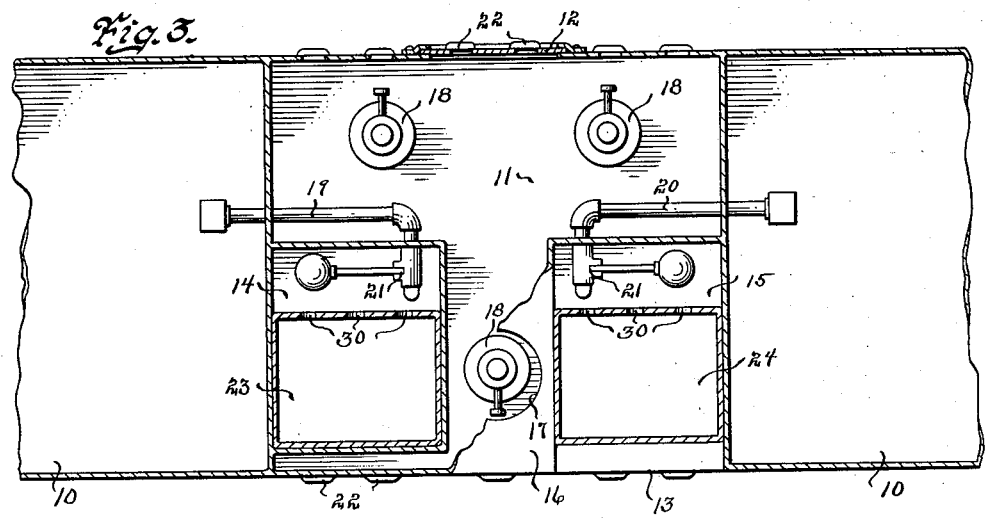
Fig. 3 is a plan sectional view of our tank taken on line 3—3 of Fig. 2.
Figure 4:
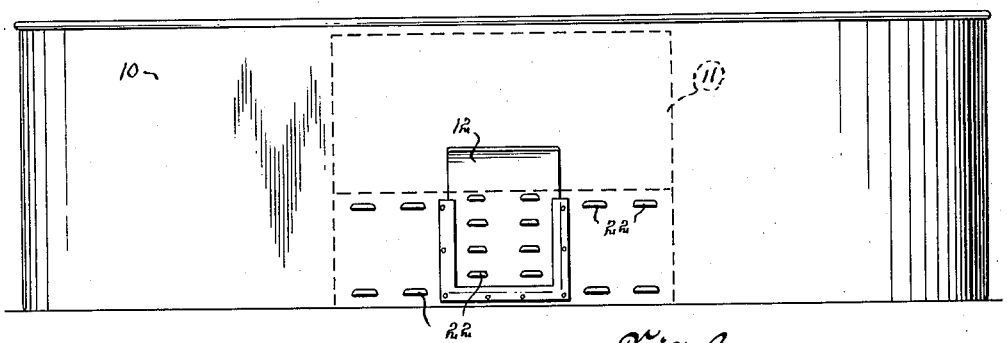
Fig. 4 is a back plan view of the tank.
Figure 5:
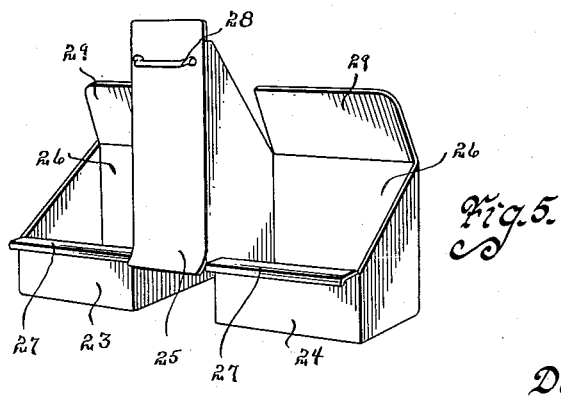
Fig. 5 is a perspective view of the removable small animal drinking compartment portion.

Referring to the drawings we have used the numeral 10 to designate an ordinary standard type water tank. It is to such a tank that we install our invention. In the center bottom of the tank and extending its complete width, we have formed a heat, and water unit compartment 11. This compartment, which extends transverse of the length of the tank 10, has its top extending from the back side of the tank, first horizontally and then upwardly and forwardly to the front side of the tank, as shown in Fig. 2. The numeral 12 designates a door in the rear side center of the tank communicating with the compartment 11. The center front side of the tank 10 is cut into a rectangular opening 13, which communicates with the front end of the compartment. This opening 13 extends from a point substantially above the bottom of the tank to a point near the top of the tank, as shown in Fig. 1. The width of the compartment proper is substantially that of the width of the opening 13. In the forward end portion of the compartment are two spaced apart water reservoirs 14 and 15. These reservoirs are adjacent the two side walls of the compartment, respectively, but are spaced apart from the front of the tank and from the bottom of the tank, as shown in the drawings. This spacing permits the heat to contact three sides and the bottom of each of the open top reservoirs. These reservoirs extend rearwardly in the tank to points where the top of the heating compartment starts to extend forwardly and upwardly. A top closing plate 16 extends between the tops of the reservoirs, thereby closing the heating area of the compartment to the outside atmosphere through the front opening 13. A service hole 17 may be formed in the plate 16, as shown in Fig. 3, to facilitate the placement or servicing of a lamp thereunder. Any suitable heating means desired may be used, but we recommend lamps 18 which may be placed in the rear of the heating compartment and between the two reservoirs as shown. If desired, all of the lamps can be serviced through the rear door. By this arrangement of the heating compartment, the same is substantially covered with water when the tank is substantially full of water, and this water in the main tank will also be at each side of the heating compartment. The numerals 19 and 20 designate supply pipes extending from the main tank to each of the reservoirs. On the end of each pipe that extends into a reservoir is a float actuated valve 21. By this arrangement water from the main tank will be supplied at a predetermined level within the reservoirs at all times. This water in the main tank and in both reservoirs will be kept from freezing by the efficient placement of the heating compartment herebefore described. In warm weather, of course, no heat is necessary. Ventilation ports 22 are formed in the door and may also be formed in the front side of the tank, as shown. One of the principal features of our device is the small animal water trough portion, and which we will now describe. This portion is preferably of one unit, and consists chiefly of two trough portions 23 and 24, spaced apart and joined together by a connecting portion 25, as shown in Fig. 5. Each of these trough portions have a raised back side 26 and a front side that has its upper marginal edge bent outwardly and then downwardly to form a hook portion 27. The connecting portion 25 is formed by extending the two inner sides of the troughs joining them with a vertical panel portion. A handle member 28 is placed near the top of the panel portion of the connecting portion 25. This unit trough portion is designed to rest within the opening 13 of the tank with the two trough portions extending downwardly into the two reservoirs, respectively, as shown in Fig. 1. When the unit is in such position the hook portion 27 will extend over and around the bottom of the opening 13, and the top of the panel portion will engage the portion of the main tank above the opening 13, thereby properly holding the trough unit in the main tank. Wings 29 may be placed on the back sides of each of the troughs for engaging the underside of the top of the compartment in which the unit operates for further support and for sanitary purposes. Holes 30 are placed in the back wall of each trough slightly above its bottom, as shown in Fig. 2. Water from the reservoirs will run into the troughs through these holes. By the holes being positioned a distance above the bottom of the troughs, dirt or other matter getting into troughs will not readily pass into the reservoirs. Small animals may easily drink from the lowered positions of the troughs. When the troughs get dirty, it is merely necessary to grasp the handle 28 and swing the top of the unit outwardly as shown by dotted lines in Fig. 2, thereby sloshing the water and dirt out of the troughs. By moving the unit back to its normal position, fresh clean water will pass through the trough holes from the reservoirs. This swinging movement of the unit is made possible by the panel of the portion 25 extending below the opening 13, and the hook portions 27 extending over and around the bottom edge of the opening 13. If desired, the unit may be completely removed, as shown in Fig. 5. When the unit is in normal position the connecting portion 25 embraces the top plate 16 and seals the hole 17. To service a lamp below the plate 16, it is merely necessary to swing the top of the unit outwardly to expose the hole 17.

With our tank both large and small animals may drink at the same time. In the coldest weather all water will be warmed and kept from freezing. The operation of coal oil or like lamps are most economical and it is surprising that such small heating units can keep all the water compartments from freezing. The reason for this is the positioning of the heating compartment relative to the water holding portions. The large main tank, even if not used for large animals, provides a real reserve of water for the reservoirs. If desired, the small animal troughs may be dispensed with and the large main tank used for large animals only. When this is done, the reservoirs, and kindred parts, as well as the opening 13 may be dispensed with.

Some changes may be made in the construction and arrangement of our heatable water tank without departing from the real spirit and purpose of our invention, and it is our intention to cover by our claims, any modified forms of structure or use of mechanical equivalents which may be reasonably included within their scope.

We claim:

1. In a device of the class described, a main tank open at its top and having an opening in two opposite sides, a compartment extending across a portion of the bottom of said tank and communicating at each end with the two oppositely arranged openings in the side of said tank, a door closing one of said openings, two spaced apart reservoirs in said compartment spaced adjacent the other said opening and spaced above the bottom of said compartment, a plate extending between the tops of said reservoirs, two trough units connected together and having their bottom portions normally extending into said two reservoirs respectively, water passageways in the side wall of each of said trough units, a means for connecting the inside of said main tank to said reservoirs, a hook portion on said two trough units extending over the marginal edge of the adjacent tank side opening, and a heating means inside said compartment.

2. In a device of the class described, a main tank open at its top and having an opening in two opposite sides, a compartment extending across a portion of the bottom of said tank and communicating at each end with the two oppositely arranged openings in the side of said tank, a door closing one of said openings, two spaced apart reservoirs in said compartment spaced adjacent the other said opening and spaced above the bottom of said compartment, a plate extending between the tops of said reservoirs, two trough units connected together and having their bottom portions normally extending into said two reservoirs respectively, water passageways in the side wall of each of said trough units, a means for connecting the inside of said main tank to said reservoirs, a hook portion on said two trough units extending over the marginal edge of the adjacent tank side opening, a heating means inside said compartment, and a handle member on said two trough unit to facilitate the manual swinging of the upper portion of said two trough unit through the adjacent side tank opening.

3. In a device of the class described, a main tank open at its top and having an opening in two opposite sides, a compartment extending across a portion of the bottom of said tank and communicating at each end with the two oppositely arranged openings in the side of said tank, a door closing one of said openings, two spaced apart reservoirs in said compartment spaced adjacent the other said opening and spaced above the bottom of said compartment, a plate extending between the tops of said reservoirs, two trough units connected together and having their bottom portions normally extending into said two reservoirs respectively, water passageways in the side wall of each of said trough units, a means for connecting the inside of said main tank to said reservoirs, a hook portion on said two trough units extending over the marginal edge of the adjacent tank side opening, a heating means inside said compartment, a handle member on said two trough unit to facilitate the manual swinging of the upper portion of said two trough unit through the adjacent side tank opening; said plate having a service opening closable to the outside atmosphere when said two trough unit is in normal position, and ventilation openings communicating with said compartment.

4. In a device of the class described, a compartment having an opening, two spaced apart reservoirs in the open end portion of said compartment, a plate extending between the tops of said two reservoirs; a means for maintaining a water level in said reservoirs, a detachable two trough unit in the open end portion of said compartment having its two troughs normally extending into said two reservoirs respectively, a hook portion on said unit extending over the bottom marginal edge of said opening, a handle portion on said unit for swinging its upper end portion outwardly through said opening, and water passageways in said unit for furnishing water to said two troughs from said reservoirs.

5. In a device of the class described, a compartment having an opening, two spaced apart reservoirs in the open end portion of said compartment, a plate extending between the tops of said two reservoirs; a means for maintaining a water level in said reservoirs, a detachable two trough unit in the open end portion of said compartment having its two troughs normally extending into said two reservoirs respectively, a hook portion on said unit extending over the bottom marginal edge of said opening, a handle portion on said unit for swinging its upper end portion outwardly through said opening, water passageways in said unit for furnishing water to said two troughs from said reservoirs, and a means for heating said compartment.

DONALD J. DONAHOE.
PAUL J. DONAHOE.

REFERENCES CITED

The following references are of record in the file of this patent:

UNITED STATES PATENTS

| Number | Name | Date |
| --- | --- | --- |
| 822,440 | Falk | June 5, 1906 |
| 838,246 | Falk | Dec. 11, 1906 |
| 994,543 | Smith | June 6, 1911 |
| 1,353,146 | Clemons | Sept. 21, 1920 |
| 1,392,513 | McCollough | Oct. 4, 1921 |
| 1,402,953 | Pagel | Jan. 10, 1922 |
| 1,414,811 | Ingvoldstad | May 2, 1922 |
| 2,256,751 | Roe | Sept. 23, 1941 |
| 2,345,400 | Laughead et al. | Mar. 28, 1944 |
| 2,430,165 | Fine | Nov. 4, 1947 |
| 2,490,824 | Meisner | Dec. 13, 1949 |